US008908712B2

(12) United States Patent
Qu

(10) Patent No.: US 8,908,712 B2
(45) Date of Patent: Dec. 9, 2014

(54) METHOD, SYSTEM AND ACCESS DEVICE FOR IMPLEMENTING SERVICE CONFIGURATION

(75) Inventor: Zhijun Qu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 12/491,409

(22) Filed: Jun. 25, 2009

(65) Prior Publication Data

US 2009/0257436 A1    Oct. 15, 2009

Related U.S. Application Data

(63) Continuation of application No. PCT/CN2007/071050, filed on Nov. 12, 2007.

(30) Foreign Application Priority Data

Dec. 31, 2006  (CN) .......................... 2006 1 0063767

(51) Int. Cl.
*H04L 5/14* (2006.01)
*H04L 29/06* (2006.01)
*H04L 12/28* (2006.01)

(52) U.S. Cl.
CPC ............ *H04L 12/2883* (2013.01); *H04L 69/24* (2013.01)
USPC ............................. 370/431; 370/465; 709/237

(58) Field of Classification Search
CPC ............ H04L 12/2869; H04L 12/2878; H04L 12/2881; H04L 12/2883; H04L 29/06537; H04L 29/06163
USPC ........ 370/395.1, 431, 438, 439; 709/230, 237
See application file for complete search history.

(56) References Cited

U.S. PATENT DOCUMENTS

| 6,067,316 A | 5/2000 | Amrany et al. |
| 6,084,881 A | 7/2000 | Fosmark et al. |

(Continued)

FOREIGN PATENT DOCUMENTS

| CN | 1581812 | 2/2005 |
| CN | 1741465 A | 3/2006 |

(Continued)

OTHER PUBLICATIONS

ITU-T, G.993.1, Very high speed digital subscriber line transceivers, Jun. 2004.*

(Continued)

*Primary Examiner* — Ayaz Sheikh
*Assistant Examiner* — Tarell Hampton
(74) *Attorney, Agent, or Firm* — Leydig, Voit & Mayer, Ltd.

(57) ABSTRACT

An access device, a system and a method for implementing service configuration are disclosed. The method includes: identifying, by an access device AN, an operation mode of a CPE according to a result of a handshake negotiation performed between the line port of the access device CN and the CPE, and selecting a corresponding preset service template according to the operation mode of the CPE, and then configuring the line port according to the service template selected, thereby implementing the self adaptation of the ATM mode and PTM mode of the CPE. With the technical solution of the invention, when VDSL2 service is provided, the service may automatically access subscribers of ADSL ATM mode and subscribers of VDSL PTM mode simultaneously, and an automatic configuration and management may be realized for all the service configurations in different modes, and thus the operation complexity may be simplified, and the operation cost may be lowered.

6 Claims, 4 Drawing Sheets

(56) References Cited

U.S. PATENT DOCUMENTS

| | | | |
|---|---|---|---|
| 6,778,505 B1* | 8/2004 | Bullman et al. | 370/254 |
| 6,898,280 B1* | 5/2005 | Dombkowski et al. | 379/399.01 |
| 2003/0041237 A1 | 2/2003 | Mcelroy et al. | |
| 2003/0135596 A1 | 7/2003 | Moyer et al. | |
| 2003/0235198 A1* | 12/2003 | McElroy et al. | 370/395.5 |
| 2004/0095929 A1* | 5/2004 | Aoshima | 370/389 |
| 2006/0126549 A1* | 6/2006 | Bourlas et al. | 370/310 |
| 2006/0146945 A1* | 7/2006 | Chow et al. | 375/260 |
| 2006/0210054 A1* | 9/2006 | Stiscia | 379/399.01 |
| 2008/0063007 A1* | 3/2008 | Christiaens et al. | 370/458 |

FOREIGN PATENT DOCUMENTS

| | | |
|---|---|---|
| CN | 101002141 | 7/2007 |
| CN | 101047584 | 10/2007 |
| EP | 1207673 A1 | 5/2002 |

OTHER PUBLICATIONS

ITU-T, G.994.1, Handshake procedures for digital suscriber line (DSL) transceivers, May 2003.*

Extended European Search Report in corresponding European Application No. 07817240.0 (Mar. 29, 2010).

Written Opinion of the International Searching Authority in corresponding PCT Application No. PCT/CN2007/071050 (Feb. 14, 2008).

International Search Report in corresponding PCT Application No. PCT/CN2007/071050 (Feb. 14, 2008).

1st Office Action in corresponding European Patent Application No. 07817240.0 (Feb. 27, 2013).

"G.vdsl: Proposed Working Text for VDSL2 Handshake," Telecommunication Standardization Sector, Study Period 2005-2008, May 16-27, 2005, ITU-T, Geneva, Switzerland.

* cited by examiner

METHOD, SYSTEM AND ACCESS DEVICE FOR IMPLEMENTING SERVICE CONFIGURATION

CROSS-REFERENCE TO RELATED APPLICATIONS

This application is a continuation of PCT patent application No. PCT/CN2007/071050 filed Nov. 12, 2007, which claims priority to Chinese patent application No. 200610063767.4 filed Dec. 31, 2006, content of which is hereby incorporated by reference in their entireties.

FIELD OF THE INVENTION

The present invention relates to the field of electronic communications, and in particular, to a method, a system and an access device for implementing service configuration.

BACKGROUND OF THE INVENTION

In Asymmetric Digital Subscriber Line (ADSL) and Very-high-bit-rate Digital Subscriber Loop 2(VDSL2) technologies, the initial bearer channel is inherited from Asynchronous Transfer Mode (ATM) technology.

FIG. 1 is a schematic diagram of the ATM mode access of ADSL/IVDSL2in the conventional art. As shown in FIG. 1, when a subscriber access to a network, an ATM mode adaptation is performed in an ADSL/VDSL2 Customer Premise Equipment (CPE) for the datagram of the subscriber, and the subscriber data is borne on the ATM link layer. A common central office access device usually accesses a subscriber device such as a Personal Computer (PC) in the ATM mode, and the CPE also employs the ATM mode.

When more and more subscribers require services occupying higher bandwidth, VDSL2 technology gradually becomes one of the selections of the operation. FIG. 2 is a schematic diagram of the PTM mode access of VDSL2 in the conventional art. As shown in FIG. 2, a Packet Transfer Mode (PTM) based on packet bearer is newly added in VDSL2. The PTM mode is a mode for the future Ethernet access, and the link layer is encapsulated in the Ethernet format.

Considering that the ADSL ATM mode has been widely employed in the existing network, when VDSL2 line services are deployed practically, these services need to be compatible with the original ADSL subscribers. Thus, requirements from two aspects are laid on the deployment of the VDSL2: the first requirement is that the physical layer of the VDSL2 line of the access device AN should be able to automatically identify whether the accessed CPE is in the ATM mode or in the PTM mode, and thus the corresponding configuration can only be made when the operation mode of the terminal is identified; the second requirement is that the service layer should be instructed to implement the automatic service configuration directed to the port when the physical layer of the VDSL2 line of the access device AN identifies the operation mode, because in the ATM mode, the ATM cell is received by the port, and the service configuration and processing are mainly based on the ATM cell, whereas in the PTM mode, an Ethernet packet in the PTM mode is received by the port, and the service configuration and processing are mainly based on the Ethernet packet. Therefore, the service layer should perform automatic adaptation according to the mode identified by the physical link. However, the above two requirements cannot be met in the conventional art.

SUMMARY OF THE INVENTION

Therefore, the main object of various embodiments of the present invention is to provide a system, a method and an access device for implementing service configuration, so as to realize automatic configuration and management for service configurations in different modes.

To achieve the above object, an embodiment of the present invention provides an access device, including: a physical line module, a service template management module and a service configuration module.

The physical line module is configured to identify an operation mode of a subscriber premise device (CPE) and report an identification result to the service template management module.

The service template management module is configured to select a corresponding service template according to the operation mode of CPE received and notify the service configuration module of a selection result.

The service configuration module is configured to configure a corresponding line port according to the selected service template.

Meanwhile, an embodiment of the present invention provides a system for implementing service configuration. The system includes a subscriber premise device (CPE) and an access device connected with each other. The access device is configured to automatically adapt an operation mode of a subscriber port according to an operation mode of the CPE identified by the access device.

An embodiment of the invention further provides a method for implementing service configuration. The method includes: identifying an operation mode of a subscriber premise device (CPE); selecting a corresponding service template according to the operation mode of the CPE identified; and configuring a subscriber port according to the service template selected.

As can be seen, the corresponding template is automatically selected from presetting service templates for configuring a subscriber port by using the operation mode of a CPE identified by the physical layer of the access device in the embodiments of the present invention, so that when a VDSL2 service is provided, subscribers of the original ADSL ATM mode and subscribers of the new VDSL PTM mode may automatically access the service simultaneously, and thus automatic configuration and management may be realized for service configurations in different modes, the operation complexity may be simplified, and the operation cost may be lowered.

DETAILED DESCRIPTION OF THE EMBODIMENTS

In an embodiment of the present invention, the line terminal of an access device AN automatically performs handshake negotiation with a Customer Premises Equipment, i.e. a CPE, via the physical layer, determines the operation mode of the CPE according to the result of the handshake negotiation, selects the corresponding template from the predefined templates according to the operation mode of the CPE, and then performs service configuration for the subscriber port according to the selected template.

To make the objects, technical solutions and advantages of the present invention more apparent, details are further illustrated in conjunction with the drawings and embodiments.

Figure 1:
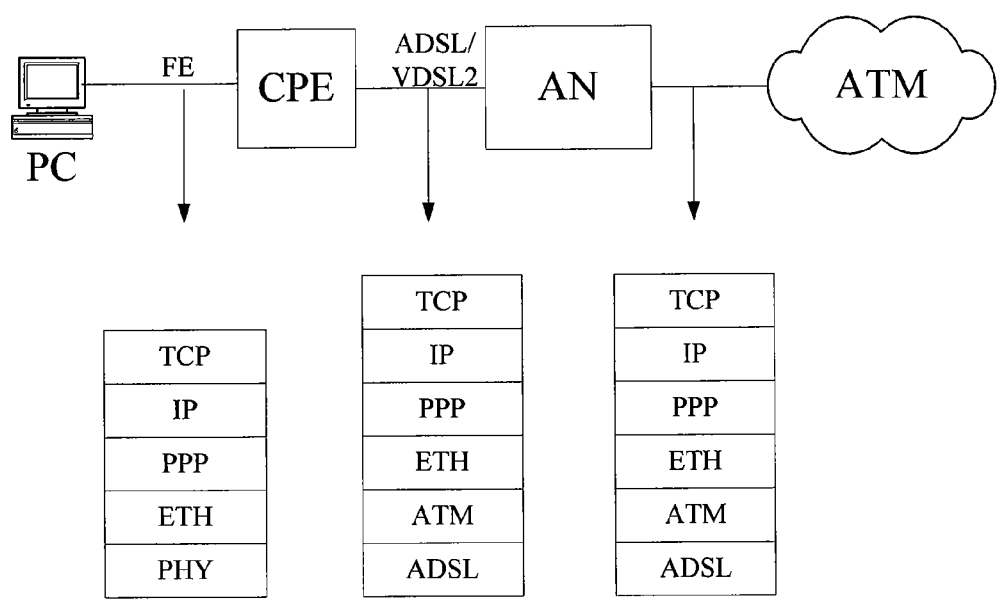
FIG. 1 is a schematic diagram of the ATM mode access of ADSL/VDSL2 in the conventional art.
Figure 2:
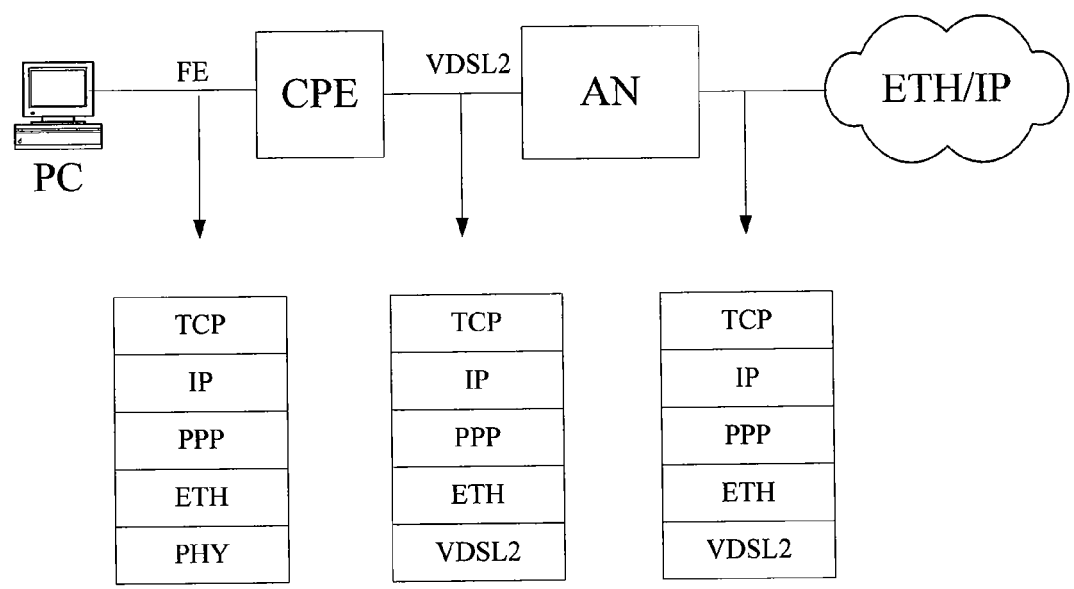
FIG. 2 is a schematic diagram of the PTM mode access of VDSL2 in the conventional art.
Figure 3:
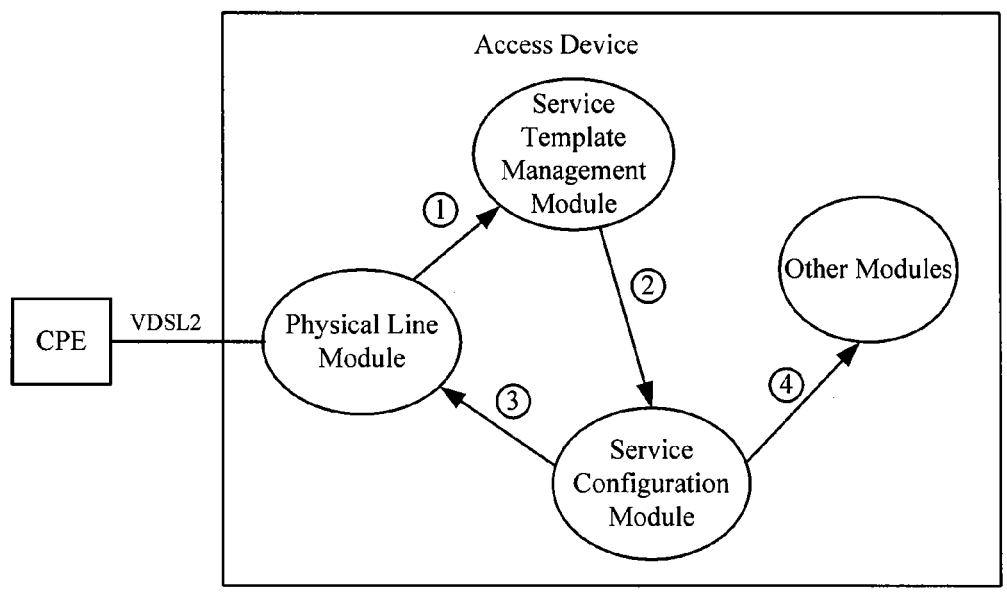
FIG. 3 is a schematic diagram showing a structure and an external connection of an access device according to an embodiment of the present invention.

FIG. 3 is a schematic diagram showing a structure and an external connection of an access device according to an embodiment of the present invention. As shown in FIG. 3, the access device according to the embodiment of the present invention includes: a VDSL2 physical line module, a service template management module and a service configuration module.

In FIG. 3, the VDSL2 physical line module is configured to automatically perform handshake negotiation with a CPE, determine and automatically identify the operation mode of the CPE according to the negotiation result. After identifying the operation mode of the CPE, the physical line module reports the operation mode of the CPE to the service template management module via a message.

The service template management module is configured to: predefine service templates according to modes of the service operation, where the predefined service templates includes service template in the ATM mode, service template in the PTM mode and other service templates; and also configured to receive the operation mode information of the CPE reported by the physical line module, select the corresponding service template from the predefined service templates, and notify the service configuration module of the selected service template.

The service configuration module is responsible for the service configuration of the port: receiving a message from the service template management module, configuring the corresponding subscriber port with the selected service template according to the content of the message, implementing the automatic configuration of the service, and notifying other module, such as a network management module, of a service configuration success information, when it is acknowledged that the service configuration is successful.

Figure 4:
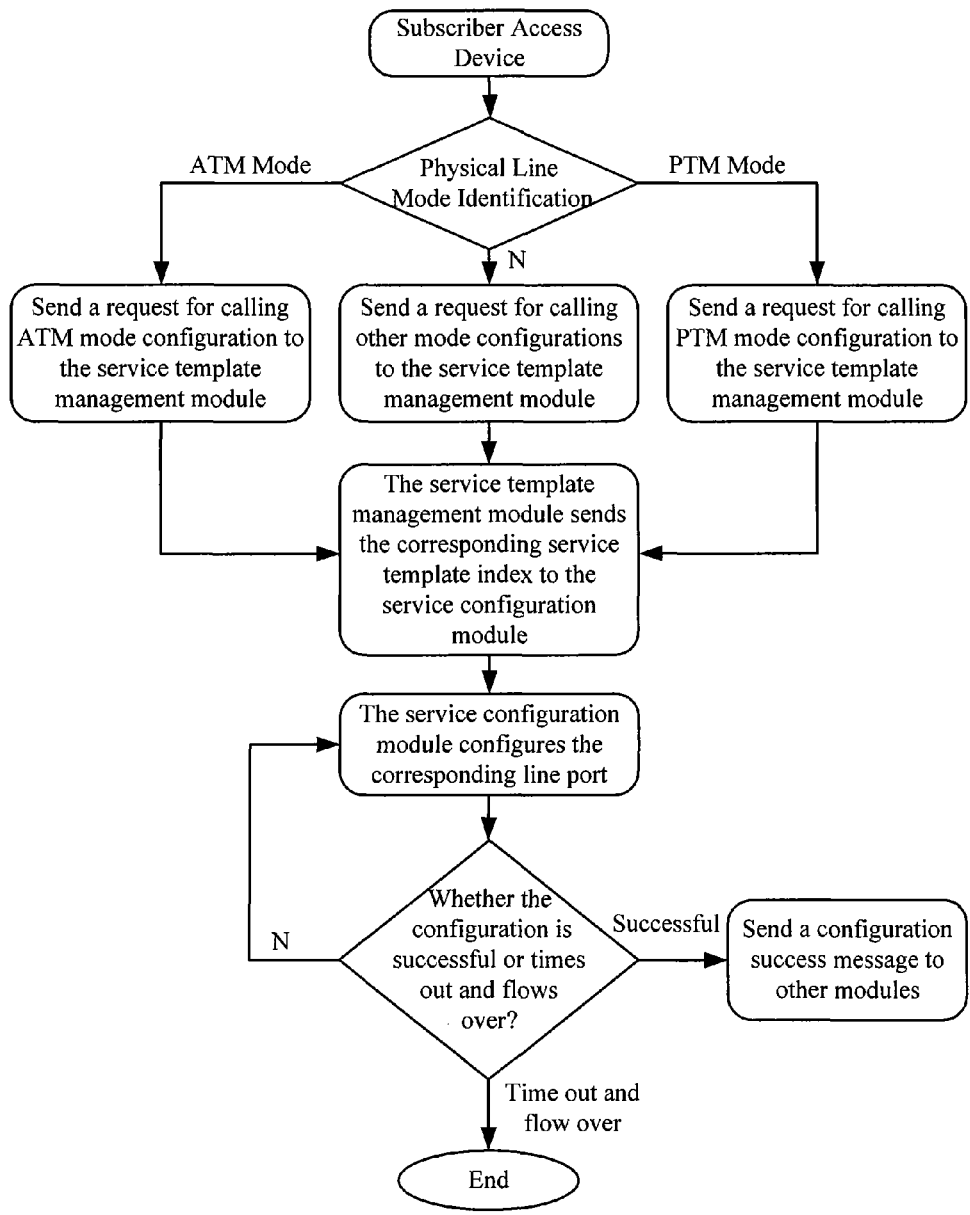
FIG. 4 is a flow chart of a method for implementing service configuration according to an embodiment of the present invention.

FIG. 4 is a flow chart of a method for implementing service configuration according to an embodiment of the present invention. As shown in FIG. 4, the method includes the following steps:

Step A: The mode of a CPE is identified. The line port of the VDSL2 access device AN automatically performs a handshake negotiation with the CPE, determines and automatically identifies the operation mode of the CPE according to the negotiation result, and reports the operation mode of the port via a message;

Step B: The corresponding service template is selected according to the identified operation mode. In particular, service templates, which may include the service template in the ATM mode, the service template in the PTM mode and other service templates, are predefined according to the modes of service operation. The operation mode information of the port reported by the physical line is received, and a corresponding service template is selected from the predefined service templates. In addition, the service configuration module is instructed to configure the service mode of the subscriber port according to the selected service template.

Step C: The subscriber port is configured according to the selected service template, and it is determined whether the configuration is successful or times out after the configuration of the subscriber port is completed. If the configuration times out, the configuration is ended; and if the service configuration is successful, a service configuration success message is sent to other module such as the network management module.

An embodiment of the present invention further provides an access network system, which can implement ATM and PTM adaptation. The access network system includes a CPE and an access device.

The VDSL2 access device automatically performs handshake negotiation with the CPE via a line port, and the operation mode of the CPE may be identified according to a result of the handshake negotiation. The access device may predefine service templates for different modes such as ATM operation mode, PTM operation mode and other operation modes. Corresponding to the identified operation mode of the CPE, the access device may automatically select a service template of the corresponding mode for configuring the subscriber port, and thus the service layer may perform automatic adaptation according to different modes identified by the physical link, and therefore the service adaptive configuration in VDSL2 ATM mode and VDSL2 PTM mode may be realized. Although the present invention is described with the embodiments, it is known to those skilled in the art that a plurality of variations and modifications may be made with respect to the present invention without departing from the scope of the invention. The claims in the application documents of the present invention include such variations and equivalents.

The invention claimed is:

1. An access device comprising:
 a Very-high-bit-rate Digital Subscriber Loop 2 (VDSL2) physical line module;
 a service template management module; and
 a service configuration module;
 wherein the VDSL2 physical line module is configured to identify an operation mode of a Customer Premise Equipment (CPE) connected to a subscriber port of the access device by performing a handshake negotiation with the CPE and to report the operation mode to the service template management module the operation mode being one of the group consisting of an Asynchronous Transfer Mode (ATM) and a Packet Transfer Mode (PTM);
 wherein the service template management module is configured to predefine an ATM service template and a PTM service template to select a service template corresponding to the operation mode of the CPE reported by the VDSL2 physical line module and to notify the service configuration module of the selected service template; and
 wherein the service configuration module is configured to configure the subscriber port of the access device according to the selected service template.

2. A method for implementing service configuration, comprising:
 performing, by an access device, a handshake negotiation with a Customer Premise Equipment (CPE);
 identifying, by the access device, via a digital subscriber line (DSL) connection with the CPE through a subscriber port of the access device, an operation mode of the CPE, wherein the operation mode of the CPE can be selectively configured by a Very-high-bit-rate Digital Subscriber Loop 2 (VDSL2) physical line module of the access device based on the handshake negotiation, the operation mode of the CPE being one of the group consisting of: an Asynchronous Transfer Mode (ATM) and a Packet Transfer Mode (PTM);

selecting, by the access device from a set of predefined service templates, a service template corresponding to the identified operation mode of the CPE, wherein the set of predefined service templates comprises an ATM service template and a PTM service template; and configuring, by the access device, the subscriber port of the access device according to the selected service template.

3. A system for implementing service configuration, comprising:

a Customer Premise Equipment (CPE); and an access device comprising a Very-high-bit-rate Digital Subscriber Loop 2 (VDSL2) physical line module a service template management module and a service configuration module;

wherein the access device is configured to connect to the CPE via a VDSL2 physical line, to identify an operation mode of the CPE by performing a handshake negotiation with the CPE via a subscriber port to predefine an Asynchronous Transfer Mode (ATM) service template and a Packet Transfer Mode (PTM) service template to select a service template corresponding to the identified operation mode of the CPE and to configure the subscriber port of the access device according to the selected service template;

wherein the VDSL2 physical line module is configured to identify the operation mode of the CPE by performing the handshake negotiation with the CPE and to report the operation mode of the CPE to the service template management module, the operation mode of the CPE being one of the group consisting of: the ATM and the PTM;

wherein the service template management module is configured to predefine a service template for ATM and a service template for PTM to select a service template corresponding to the operation mode of the CPE reported by the VDSL2 physical line module and to notify the service configuration module of the selected service template; and the service configuration module is configured to configure the subscriber port of the access device according to the selected service template.

4. The method according to claim 2, the method further comprising:

determining whether the configuration is successful or times out;

ending the configuration if the configuration times out; and sending a service configuration success message if the service configuration is successful.

5. The access device according to claim 1, wherein the service configuration module is further configured to determine if the configuration is successful and if the configuration times out, to end the configuration if the configuration times out, and to send a service configuration success message if the service configuration is successful.

6. The system according to claim 3, wherein the service configuration module is further configured to determine if the configuration is successful and if the configuration times out, to end the configuration if the configuration times out, and to send a service configuration success message if the service configuration is successful.

* * * * *